(12) United States Patent
Jin et al.

(10) Patent No.: US 11,568,268 B2
(45) Date of Patent: Jan. 31, 2023

(54) DEEP LEARNING HETEROGENEOUS COMPUTING METHOD BASED ON LAYER-WIDE MEMORY ALLOCATION AND SYSTEM THEREOF

(71) Applicant: Huazhong University of Science and Technology, Hubei (CN)

(72) Inventors: Hai Jin, Hubei (CN); Xiaofei Liao, Hubei (CN); Long Zheng, Hubei (CN); Haikun Liu, Hubei (CN); Xi Ge, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 608 days.

(21) Appl. No.: 16/748,284

(22) Filed: Jan. 21, 2020

(65) Prior Publication Data

US 2020/0272907 A1    Aug. 27, 2020

(30) Foreign Application Priority Data

Feb. 22, 2019   (CN) .......................... 201910136545.8

(51) Int. Cl.
  *G06N 3/04*    (2006.01)
  *G06N 3/10*    (2006.01)
  (Continued)

(52) U.S. Cl.
  CPC ............ *G06N 3/10* (2013.01); *G06F 9/5016* (2013.01); *G06N 3/04* (2013.01); *G06N 3/084* (2013.01)

(58) Field of Classification Search
  CPC . G06N 3/10; G06N 3/04; G06N 3/084; G06F 9/5016
  See application file for complete search history.

(56) References Cited

U.S. PATENT DOCUMENTS

| 10,572,225 | B1 * | 2/2020 | Ghasemi ................ G06N 3/08 |
| 2016/0379109 | A1 * | 12/2016 | Chung ................ G06F 15/7803 |
| | | | 706/26 |

(Continued)

FOREIGN PATENT DOCUMENTS

| CN | 104835110 | 8/2015 |
| CN | 106991474 | 7/2017 |

(Continued)

*Primary Examiner* — Michael J Huntley
*Assistant Examiner* — Oluwatosin O Alabi
(74) *Attorney, Agent, or Firm* — Michael Ye, Esq.; Rimon Law

(57) ABSTRACT

A deep learning heterogeneous computing method based on layer-wide memory allocation, at least comprises steps of: traversing a neural network model so as to acquire a training operational sequence and a number of layers L thereof; calculating a memory room $R_1$ required by data involved in operation at the $i^{th}$ layer of the neural network model under a double-buffer configuration, where $1 \leq i \leq L$; altering a layer structure of the $i^{th}$ layer and updating the training operational sequence; distributing all the data across a memory room of the CPU and the memory room of the GPU according to a data placement method; performing iterative computation at each said layer successively based on the training operational sequence so as to complete neural network training.

6 Claims, 3 Drawing Sheets

(51) Int. Cl.
    *G06F 9/50*         (2006.01)
    *G06N 3/08*         (2006.01)

(56)         References Cited

U.S. PATENT DOCUMENTS

| | | |
|---|---|---|
| 2018/0357541 A1 | 12/2018 | Chen et al. |
| 2019/0187963 A1* | 6/2019 | Bokhari ................ G06F 9/4881 |
| 2019/0392287 A1* | 12/2019 | Ovsiannikov ............ G06N 3/08 |
| 2020/0151088 A1* | 5/2020 | Gu ........................... G06F 5/06 |
| 2020/0257930 A1* | 8/2020 | Nahr .................... G06V 10/454 |

FOREIGN PATENT DOCUMENTS

| | | |
|---|---|---|
| CN | 107122244 | 9/2017 |
| CN | 107437110 | 12/2017 |
| CN | 107844828 | 3/2018 |
| CN | 108197075 | 6/2018 |
| CN | 109086867 | 12/2018 |
| CN | 109976903 B | 6/2021 |

\* cited by examiner

DEEP LEARNING HETEROGENEOUS COMPUTING METHOD BASED ON LAYER-WIDE MEMORY ALLOCATION AND SYSTEM THEREOF

FIELD

The present invention relates to data processing, and more particularly to a deep learning heterogeneous computing method based on layer-wide memory allocation and a system thereof.

BACKGROUND

Convolutional neural networks represent a typical area of deep learning, and outshine others in the field of computer vision, natural language processing, and voice recognition with effectiveness much better than other methods. Training for deep learning requires strong computation capability, and therefore GPUs are commonly used to accelerate training. The currently popular deep learning systems are mostly equipped with considerable GPU-based computation support. Due to its physical limitations, a GPU is much smaller than a host memory in terms of memory capacity. However, with the development of researches of deep learning, neural networks have evolved toward larger width and depth, and this trend adds demands for GPU memory for neural network training. For making it possible to train a neural network on a single graphics card, the size of the network has to be limited. Alternatively, multiple graphics cards have to be used for parallel computing.

In a neural network, the back-propagation process has to use the intermediate data generated during the forward-propagation process. Due to this fact, most of the popular deep learning systems adopt the strategy of network-wide memory allocation, which is achieved by storing the intermediate data generated during the forward-propagation process in the memory of the GPU, so that the intermediate data can be timely used to calculate the parameter updating gradient during the back-propagation process. For a neural network which does not fit in a GPU, the major limitation is actually the memory of the GPU. Training of a neural network involves execution at multiple layers, and at any given moment, a GPU can only execute computation tasks at a single layer. The strategy of network-wide memory allocation has therefore been developed to offload data that are not used for the present computation to the host memory. For minimizing the communication overhead, the memory configuration is usually of a double-buffer structure. This significantly decreases the memory size required by neural network training, and thereby the GPU only needs to have its memory as twice as large as the memory required by the largest layer of the neural network. Neural networks usually use batch-based stochastic gradient descent to identify solutions. While this batch-based method does help neural networks to have the optimal solutions converged, it requires more memory room for training. For larger batches or wider models, the memory room required by the largest layer in the neural network is larger, and is even greater than the capacity of the GPU. At this time, the layer-wide memory allocation strategy also fails. With a limited GPU memory, training of the neural network is impossible.

SUMMARY

The term "module" as used herein describes any type of hardware, software, or combination of software and hardware that is capable of performing the functions associated with "module."

In view of the shortcomings of the prior art, the present disclosure discloses a deep learning heterogeneous computing method based on layer-wide memory allocation to be executed by a CPU and a GPU jointly, storing the data involved in the joint execution process of CPU and GPU through at least one storage medium. The deep learning heterogeneous computing method at least comprising steps of: traversing a neural network model so as to acquire a training operational sequence and a number of layers L thereof. Calculating a memory room $R_1$ required by data involved in operation at the $i^{th}$ layer of the neural network model under a double-buffer configuration, where $1 \leq i \leq L$. Where the memory room $R_1$ required by the operation at the $i^{th}$ layer is greater than a memory room of the GPU, altering a layer structure of the $i^{th}$ layer and updating the training operational sequence. Where a memory room $R_2$ required by all data involved in all the layers of the neural network model is greater than the memory room of the GPU, distributing all the data across a memory room of the CPU and the memory room of the GPU according to a data placement method. Performing iterative computation at each said layer successively based on the training operational sequence so as to complete neural network training.

According to one mode, the step of altering the layer structure of the $i^{th}$ layer at least comprises steps of: acquiring an operational type corresponding to each said layer of the neural network model based on the training operational sequence. Where the $i^{th}$ layer is a convolution layer and convolution operation is to be performed, segmenting an input feature map required by it to perform the convolution operation according to a height or width dimension before the convolution layer by inserting a segment layer so as to obtain a plurality of locally-input feature maps. Performing the convolution operation based on the locally-input feature maps, respectively, so as to acquire a plurality of corresponding locally-output feature maps. Merging the plural locally-output feature maps by inserting a merge layer after the convolution layer, so as to form a complete output feature map corresponding to the convolution layer. Updating the training operational sequence.

According to one mode, the step of altering the layer structure of the $i^{th}$ layer further comprises steps of: where the $i^{th}$ layer is a pooling layer, an activation layer or a batchnorm layer, segmenting the input feature map required by it to perform the operation according to a channel dimension by inserting the segment layer before the $i^{th}$ layer, so as to obtain the plurality of locally-input feature maps. Performing the corresponding operation based on the locally-input feature maps, respectively, so as to acquire the plurality of corresponding locally-output feature maps. Merging the plural locally-output feature map by inserting the merge layer after the $i^{th}$ layer, so as to form the complete output feature map corresponding to the layer, Updating the training operational sequence.

According to one mode, the data placement method at least comprising steps of: traversing the training operational sequence. Making data involved in the segment layer and the merge layer as first data, marking data involved in the other layers as second data, and initializing an available memory room $M_1$ of the GPU that is equal to a total capacity of the GPU. Traversing the second data so as to identify a layer $L_1$ that requires the largest memory room and a layer $L_2$ that requires the second largest memory room, a memory room $R_{L1}$ required by all data involved during identification of the layer $L_1$, a memory room $R_{L2}$ required by all data involved during identification of the layer $L_2$, and a memory room $R_3$ required by the largest data block involved during identification of the layer $L_1$. Where both relations of $(R_{L1}-R_3)*2+R_3<M_1$ and $R_{L2}*2+R_3\leq M_1$ are satisfied, updating a marking of the largest data block to third data. Updating a capacity of the available memory room $M_1$ to $M_1-R_3$.

According to one mode, the data placement method further comprises steps of: where either a relation of $(R_{L1}-R_3)*2+R_3\geq M_1$ or a relation of $R_{L2}*2+R_3\geq M_1$ is satisfied, updating the capacity of the available room $M_1$ to $M_1-R_{L1}*2$, and traversing all the second data and calculating a memory room $R_4$ it requires, in which where a relation of $R_4<M_1$ is satisfied, updating a marking of the second data to the third data. Updating the capacity of the available room $M_1$ to $M_1-R_4$.

According to one mode, the data placement method further comprises steps of: traversing the second data so as to identify the layer $L_1$ that requires the largest memory room and the layer $L_2$ that requires the second largest memory room, a memory room $R_{L1}$ required by all data involved during identification of the layer $L_1$, the memory room $R_{L2}$ required by all data involved during identification of the layer $L_2$, and the memory room $R_3$ required by the largest data block involved during identification of the layer $L_1$. Where both the relations of $(R_{L1}-R_3)*2+R_3<M_1$ and $R_{L2}*2+R_3<M_1$ are satisfied, updating the marking of the largest data block to the third data. Updating the capacity of the available memory room $M_1$ to $M_1-R_3$. Repeating the preceding steps until either the relation of $(R_{L1}-R_3)*2+R_3\geq M_1$ or the relation of $R_{L2}*2+R_3\geq M_1$ is satisfied. Where either the relation of $(R_{L1}-R_3)*2+R_3\geq M_1$ or the relation of $R_{L2}*2+R_3\geq M_1$ is satisfied, traversing all the second data and calculating the memory room $R_4$ it requires, in which where the relation of $R_4<M_1$ is satisfied, updating the marking of the second data to the third data. Updating the capacity of the available room $M_1$ to $M_1-R_4$ available room $M_1$ to $M_1-R_4$.

According to one mode, the data placement method further comprises a step of: storing the first data into the memory room of the CPU, storing the remaining second data into the memory room of the CPU, and storing the third data into the memory room of the GPU.

According to one mode, the step of calculating the memory room $R_1$ at least comprises a step of: counting tensor shapes of input data and output data required by operation at every layer in the neural network model so as to verify the memory room $R_1$.

The present disclosure further discloses a deep learning heterogeneous computing system based on layer-wide memory allocation, at least comprises a CPU and a GPU. The system further comprises a neural network adjustment module, a data placement module, a scheduling module and an execution engine, in which the neural network adjustment module is such configured that when the memory room $R_1$ required by the operation at the $i^{th}$ layer is greater than the memory of the GPU, it enters a working mode where it dynamically adjusts the layer structure of the neural network model based on the manner the layer structure of the $i^{th}$ layer is changed. The data placement module is such configured that when the memory room $R_2$ required by all the data involved in the neural network model is greater than the memory of the GPU, it enters the working mode where it dynamically adjusts the data required by the training of the neural network model based on the data placement method. The scheduling module is such configured that it assigns computation tasks at the segment layer and the merge layer to the CPU. The execution engine is such configured that it controls computation at every layer to be performed according to the training operational sequence during the training of the neural network.

According to one mode, the deep heterogeneous computing system further comprises a host memory, in which the CPU is such configured that when performing computation tasks at the segment layer or the merge layer, it pre-stores the locally-input feature maps obtained through computing to the memory of the GPU. The GPU is such configured that when working on the present locally-input feature map, it pre-stores the previous locally-input feature map to the host memory. When the GPU continuously performs computation based on the locally-input feature maps so as to obtain the locally-output feature maps, the CPU merges the locally-output feature maps so as to obtain the complete output feature map.

The present invention provides the following beneficial technical effects:
(1) With structural adjustment of the neural network according to the neural network adjustment strategy, the memory room of the GPU is no more a limitation to neural network training.
(2) When the memory room of the GPU satisfies the need of training, the present invention employs a more effective data placement method to place more and more effective data in the GPU memory, thereby reducing communication overhead and accelerating neural network training.
(3) The idle computation resources of the CPU is used to perform segmenting and merging operations caused by neural network adjustment, making the most of the hardware resources.

DETAILED DESCRIPTION

The following description, in conjunction with the accompanying drawings and preferred embodiments, is set forth as below to illustrate the present invention.

It is noted that, for easy understanding, like features bear similar labels in the attached figures as much as possible.

As used throughout this application, the term "may" is of permitted meaning (i.e., possibly) but not compulsory meaning (i.e., essentially). Similarly, the terms "comprising", "including" and "consisting" mean "comprising but not limited to".

The phrases "at least one", "one or more" and "and/or" are for open expression and shall cover both connected and separate operations. For example, each of "at least one of A, B and C", "at least one of A, B or C", "one or more of A, B and C", "A, B or C" and "A, B and/or C" may refer to A solely, B solely, C solely, A and B, A and C, B and C or A, B and C.

The term "a" or "an" article refers to one or more articles. As such, the terms "a" (or "an"), "one or more" and "at least one" are interchangeable herein. It is also to be noted that the term "comprising", "including" and "having" used herein are interchangeable.

As used herein, the term "automatic" and its variations refer to a process or operation that is done without physical, manual input. However, where the input is received before the process or operation is performed, the process or operation may be automatic, even if the process or operation is performed with physical or non-physical manual input. If such input affects how the process or operation is performed, the manual input is considered physical. Any manual input that enables performance of the process or operation is not considered "physical".

Embodiment 1

Figure 1:
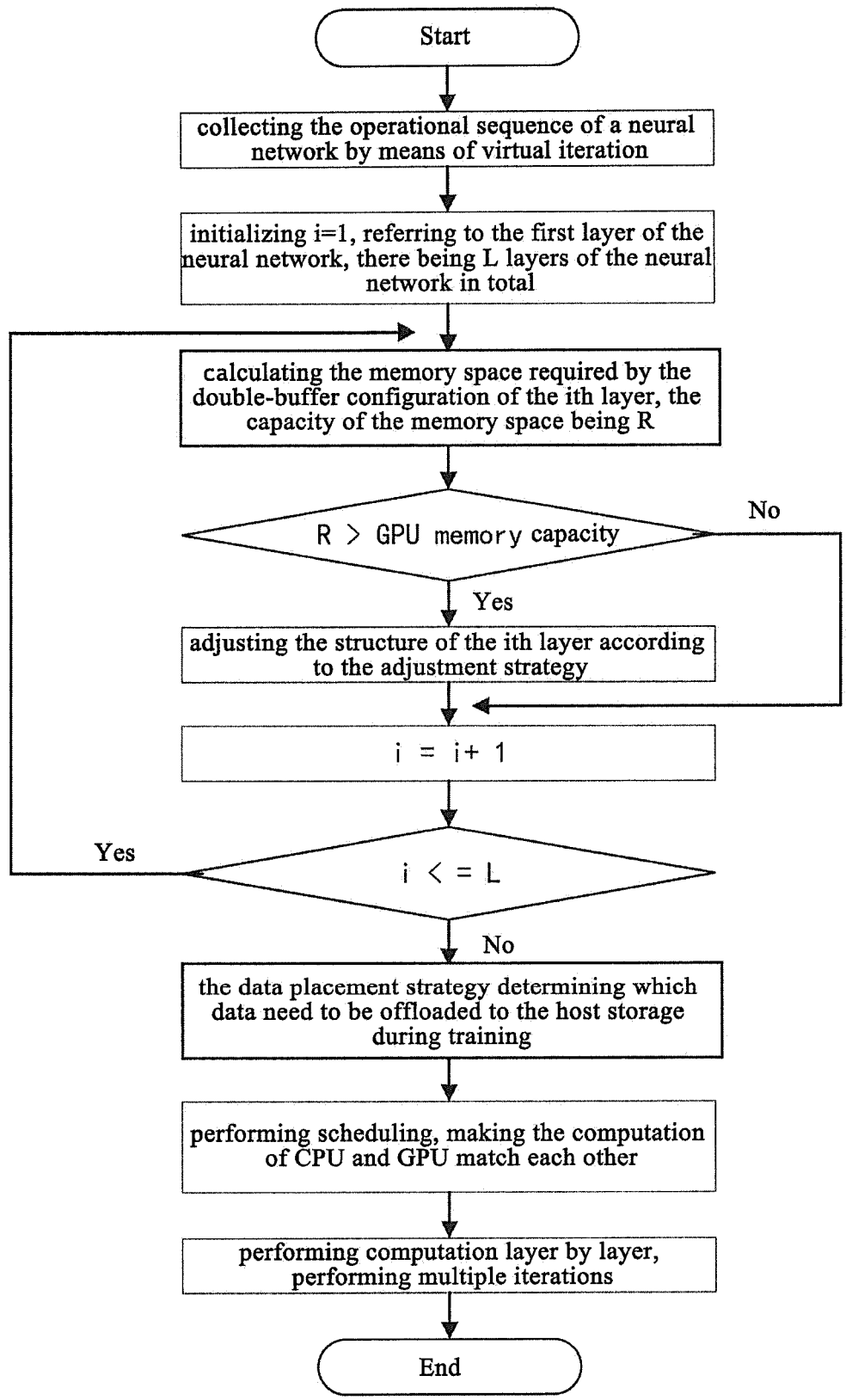
FIG. 1 is a flowchart of a preferred deep learning heterogeneous computing method according to the present invention.

As shown in FIG. 1, the present invention provides a method for structural adjustment of a neural network that changes the layer structure of a specific layer in the neural network. The method comprises the following steps:

S1: where Layer[i] is a convolution layer, and Layer[i+1] is neither an activation layer nor a pooling layer, segmenting the input feature map of the convolution layer in accordance with the height or width dimension by inserting segment layers so as to replace the convolution layer with many small convolution layers, wherein the small convolution layers take the locally-input feature maps as their inputs to output the corresponding locally-output feature maps, inserting merge layers to merge the locally-output feature maps, thereby generating a complete output feature map, and ending the flow; otherwise, proceeding with Step S2; wherein the term "Layer[i]" refers to the $i^{th}$ layer of the neural network;

S2: where Layer[i] is a convolution layer, and Layer[i+1] is a activation layer or a pooling layer, segmenting the input feature map of the convolution layer in accordance with the height or width dimension by inserting segment layers so as to replace the convolution layer with many small convolution layers, directly activating or pooling the locally-output feature maps of the small convolution layers, merging the locally-output feature maps by inserting merge layers, and ending the flow; otherwise, proceeding with Step S3;

S3: where Layer[i] is a convolution layer, and Layer[i+1] is an activation layer, while Layer[i+2] is a pooling layer, segmenting the input feature map of the convolution layer in accordance with the height or width dimension by inserting segment layers so as to replace the convolution layer with many small convolution layers, directly activating and pooling the locally-output feature maps of the small convolution layers, then merging the locally-output feature maps by inserting merge layers, thereby generating a complete output feature map, and ending the flow; otherwise, proceeding with Step S4;

S4: where Layer[i] is an activation layer, a pooling layer or a batchnorm layer, segmenting the input feature map of the layer in accordance with the channel dimension by inserting segment layers, activating, pooling or batchnorming the segmented locally-input feature maps, then merging the locally-output feature maps by inserting merge layers, and ending the flow.

For clear explanation, the foregoing steps are description below in the instance of a convolutional neural network.

The convolutional neural network is composed of three parts. The first part is an input layer, and the second part is composed of a plurality of convolution layers, pooling layers and activation layers, while the third part is a fully connected multilayer perceptron. The convolutional neural network may be built differently in terms of structure using different ways, and is usually expressed as follows:

INPUT→[[CONV]*N→[POOLING]M→[FC]K

The structure of the convolutional neural network expressed in the expression above is about having N convolution layers stacked, adding a pooling layer in an optional way, repeating this structure for M times, and at last adding K fully connected layers.

Figure 2:
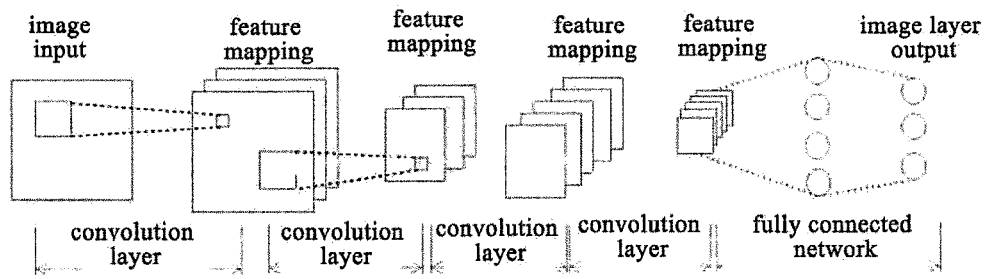
FIG. 2 is a schematic drawing illustrating the structure of a preferred convolutional neural network according to the present invention.

FIG. 2 shows a preferred layer structure of the convolutional neural network where N=1, M=2, and K=2. The width and height of the input layer correspond to the width and height of the input image, wherein the depth of the input image is 1. Preferably, the first convolution layer includes three convolution kernels. By performing convolution operation on the input image based on the three convolution kernels at the same time, three first output feature maps are obtained. The three first output feature maps are taken as the input feature maps of the first pooling layer of the first convolution layer. By pooling the three first output feature maps based on the first pooling layer, three second output feature maps are obtained.

Referring to FIG. 2 again, since M=2, the foregoing structure has to be circularized so as to perform convolution operation and pooling operation on the three second output feature maps again. Therein, the second convolution layer may have a different amount of convolution kernels when compared to the first convolution layer. The second convolution layer may have five convolution kernels. Therein, every convolution kernel of the second convolution layer convolves the three second output feature maps together so as to obtain a new third output feature map. Thus, after the five convolution kernels of the second convolution layer convolve the three second output feature maps, five third output feature maps can be obtained. Then the five third output feature maps are pooled by the second pooling layer to generate five fourth output feature maps.

Still referring to FIG. 2, since K=2, the convolutional neural network has a first fully connected layer and a second fully connected layer. The first fully connected layer has its every neuron connected to every neuron of the five fourth output feature maps in the previous layer. The second fully connected layer and the first fully connected layer are connected in each neuron. The second fully connected layer is the output layer of the neural network. In this way, the complete input and output of the entire neural network can be obtained.

In the process of training the neural network, processing such as convolution, pooling and activation is performed on the input feature map layer by layer, beginning from the input layer. The essence of Steps S1~S4 is to, before computation of each layer, identify the type of the layer or identify the type of computation processing, to be performed on the input feature map of the layer, and accordingly process the input feature map of the presently worked layer. Particularly, where the present worked layer is a convolution layer or convolution operation has to be performed on the input feature map, a segment layer is inserted before the present worked layer so as to, before convolution operation is performed on the input feature map of the convolution layer, segment the input feature map in accordance with the height or width dimension, thereby obtaining a plurality of locally-input feature maps. Where the presently worked layer is any one of a pooling layer, an activation layer and a batchnorm layer, a segment layer is inserted before the present worked layer, so as to segment its input feature map in accordance with the channel dimension, thereby obtaining a plurality of locally-input feature maps. After the locally-input feature maps are processed in accordance with the layer structure of the neural network and the locally-output feature maps are obtained, the locally-output feature maps are merged by inserting merge layers so as to obtain a complete output feature map.

Figure 3:
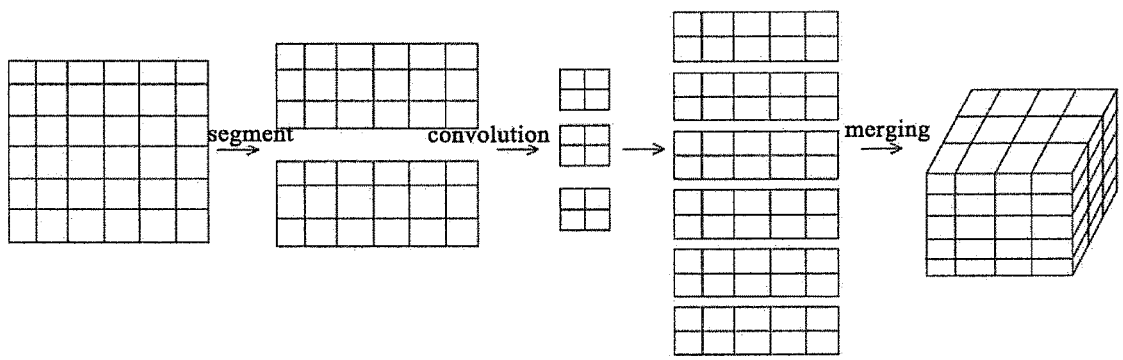
FIG. 3 is a flowchart of preferred neural network adjustment according to the present invention based on the convolutional neural network of FIG. 2.

Staying on FIG. 2, the convolutional neural network has 7 layers from the left to the right. Traversal is performed to identify the layer structure of the convolutional neural network. For example, in a convolutional neural network having N layers, it is assumed that the first layer is the input layer, and the $N^{th}$ layer is the output layer, so i is an integer satisfying $2 \leq i < N$. Preferably, as shown in FIG. 3, during convolution operation, the input feature map is sized [6*6*3], meaning that the input feature map has a width equal to 6 pixels, a height equal to 6 pixels, and three color channels (RGB). The input feature map may be an RGB Cifar-10 image. Where i=2, the presently worked layer is the first convolution layer, and the corresponding input feature map is not segmented, when the three convolution kernels of the first convolution layer are each sized [2*2], and convolution operation is performed with Stride=1 and Padding=1, the input feature map after convolution at the first convolution layer generates three output feature maps, each sized [6*6*1]. By segmenting the input feature map corresponding to the first convolution layer in accordance with the length or width dimension, a plurality of locally-input feature maps having different sizes can be obtained. For example, an input feature map sized [6*6*1] can be segmented in the width direction into two locally-input feature maps each sized [6*4*1] (a certain level of data redundancy guarantees accuracy of the results). Therein, convolution is performed on the foregoing two locally-input feature maps based on the three convolution kernel at the same time, and six output feature maps each sized [6*4*1] are obtained. These six output feature maps may be directly merged by inserting merge layers against the convolution layers. Alternatively, they may be activated and pooled to generate a plurality of new output feature snaps and then the new output feature maps are merged by inserting merge layers. Preferably, the output feature maps are merged in a way corresponding to the way the input feature map was segmented. In other words, where the input feature map was segmented in the width direction, the output feature maps are to be merged in the width direction.

Preferably, as shown in FIG. 3, where i=3, and the presently worked layer is a pooling layer, the three output feature maps each sized [6*6*1] as a result of convolution at the first convolution layer have to be segmented. Therein, the output feature maps are segmented in accordance with the channel dimension. Particularly, many feature maps have more than one channel. Taking an input feature map sized [6*6*64] for example, by segmenting the input feature map in the channel direction, two locally-input feature maps each sized [6*6*32] are obtained. Then the two locally-input feature maps are pooled with Stride=2, thereby obtaining two locally-output feature maps each sized [3*3*32]. The locally-output feature maps are then merged.

Embodiment 2

This embodiment is a further improvement on Embodiment 1, and the repeated content is omitted.

S5: setting a first storage room and a second storage room, traversing the operation sequence of a neural network, marking data involved in computation at the segment layer and the merge layer of the neural network as first data, and marking data involved in computation at the other layers as second data. Therein, the first data is stored in the second storage room and the first storage room is initializes so that its available room $R_{available}$ is equal to its total capacity. Preferably, since more memory room is required by training computation at the segment layer and the merge layer, the training work is moved to the CPU so as to effectively reduce the memory overhead of the GPU and mitigate the effects of the adjustment of the neural network on the resulting performance;

S6: counting all the second data in the neural network, so as to identify a layer $L_1$ that requires the largest memory room and a layer $L_2$ that requires the second largest memory room, wherein the memory room occupied by all the data involved in the computation at Layer $L_1$ is $R_{L1}$, and the largest data block has a size of $R_{biggest}$, while the memory room occupied by all the data involved in the computation at Layer $L_2$ is $R_{L2}$;

S7: where $(R_{L1}-R_{biggest})*2+R_{biggest} < R_{available}$ and $R_{L2}*2+R_{biggest} < R_{available}$, marking the largest data block in Layer $L_1$ as third data and storing it into the first storage room, while dynamically adjusting the available room of the first storage room to $R_{available}=R_{available}-R_{biggest}$, and returning to Step S6; where $(R_{L1}-R_{biggest})*2+R_{biggest} > R_{available}$ or $R_{L2}*2+R_{biggest} > R_{available}$, entering Step S8 for subsequent processing;

S8: traversing all the data blocks composed of the second data, and where the data block has a size of $R_{data} < R_{available}$, storing the data blocks into the first storage room, and dynamically adjusting the available room of the first storage room to $R_{available}=R_{available}-R_{data}$. Preferably, for minimizing the total data amount to be offloaded and prefetched during training, the data required by the segment layer and the merge layer are placed into the host memory. On the prerequisite that the memory room required by the largest layer to perform operation under the double-buffer configuration is reserved, the remaining data are placed into the memory of the GPU as many as possible, thereby reducing the communication overhead.

Preferably, the first storage room is the memory of the GPU, and the second storage room is the memory of the CPU. All the data involved in computation at the segment layer at least include the un-segmented input feature map and the generated output feature maps. All the data involved in computation at the merge layer computation at least include the un-merged input feature map and the generated output feature maps.

Figure 4:
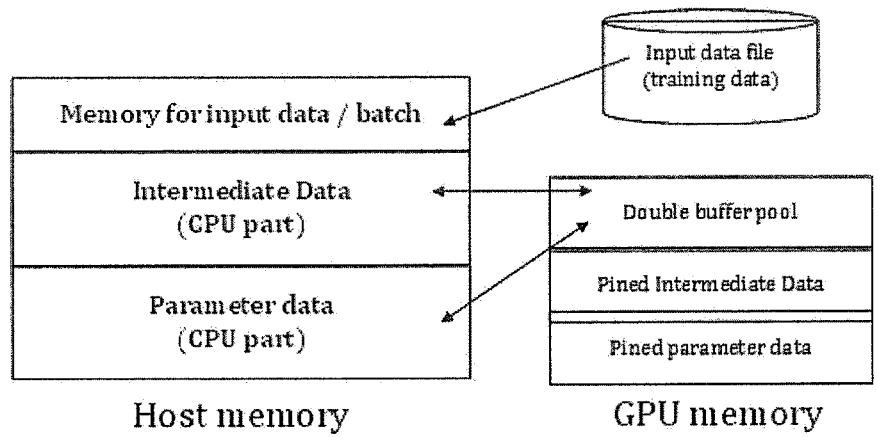
FIG. 4 illustrates a preferred data placement method according to the present invention based on the convolutional neural network of FIG. 2.

Preferably, as shown in FIG. 4, in the forward-propagation process of training for the convolutional neural network, the data involved in each of the layers at least include the input feature map, the intermediate data, and the output feature map. In the back-propagation process of training for the convolutional neural network, possible errors are recalculated based on the intermediate data, and the weights are amended accordingly. Data involved in this process at least include intermediate data and parameter data. Therein, both the memory of the CPU and the memory of the GPU are managed using plural parallel buffer pools, so as to accomplish parallel reading and writing to the memories. The memory of the CPU contains at least three common pools for storing training sample data, the intermediate data involved in the segment layer and the merge layer, and the parameter data involved in the segment layer and the merge layer, respectively. The memory of the GPU contains one double buffer pool and two common pools. Therein, the common pools store the intermediate data and the parameter data in the third data, respectively. The intermediate data and the parameter data contained in the memory of the CPU are not limited to the intermediate data and the parameters of the segment layer and the merge layer. Where the total data amount R involved in the entire network model is greater than the capacity of the GPU, a part of the data is not retained in the GPU after Step S8, and this part of data, including both intermediate data and parameter data, is fixed in the CPU. Taking the intermediate data for example, a part of the data is generated during the forward-propagation process, then transferred to the host memory, and loaded into the double buffer pool during the back-propagation process, so the intermediate data and the parameter data are interactive Embodiment 3

This embodiment is a further improvement on Embodiment 1 and 2, and the repeated content is omitted.

The present invention further provides a deep learning heterogeneous computing method based on layer-wide memory allocation, as shown in FIG. 1, which comprises the following steps:

S9: collecting the training operational sequence of a neural network by means of one virtual iteration, and counting tensor shapes of data to be input and output during operation at every layer of the neural network, wherein the memory space required by the double-buffer configuration of every layer is calculated based on the tensor shapes;

S10: where the capacity of the first storage room is greater than the memory room required by every layer, having the neural network remain its original structure and entering Step S12, and where there is one or more layers in the neural network that require a memory room greater than the capacity of the first storage room, entering Step S11 for subsequent processing;

S11: performing structural adjustment on the layers that require a memory room greater than the capacity of the first storage room using the method for structural adjustment of a neural network as described in Embodiment 1, and performing a virtual iteration on the adjusted neural network so as to collecting its training operational sequence again;

S12: where the total data amount involved in the computation at all the layers in the neural network is smaller than the capacity of the first storage room, storing all the data involved during training for the neural network into the first storage room; and where the total data amount involved in the computation at all the layers in the neural network is greater than the capacity of the first storage room, offloading a part of the data involved in computation at all the layers in the neural network to the host storage room, wherein, whether it is necessary to offload the data to the host storage room is determined using the data placement method as described in Embodiment 2; and S13: dispatching the computation resources of the CPU and the GPU according to the training operational sequence of the neural network so as to train the neural network.

For clear explanation, the following description is further directed to Steps S9, S12 and S13.

S9: collecting the training operational sequence of a neural network by means of one virtual iteration, and counting tensor shapes of data to be input and output during operation at every layer of the neural network, wherein the memory room required by the double-buffer configuration of every layer is calculated based on the tensor shapes.

Preferably, the first storage room may be the memory of the GPU and the second storage room may be the memory of the CPU, while the host storage room may be a cache. The data are all expressed in tensor. The tensor shape represents the number of dimensions of a tensor and the length of each dimension. For example, in a number set expressed as shape [2, 3], the first dimension has two elements, and the second dimension has three elements. A number set may be further specified as [[1, 2, 3], [4, 5, 6]]. Assuming that a tensor shape is expressed as [N, C, H, W], the memory room required by the tensor is R=S*(N*C*H*W). Therein, S is the number of bytes occupied by every datum of the tensor, while N, C, H and W represent the batch size, the number of channels, the height and the width of the tensor, respectively.

Preferably, a virtual iteration only happens before training for the neural network. Therein, the virtual iteration only counts the training operational sequence of the neural network and does not execute computation tasks at every layer.

S12: where the total data amount involved in the computation at all the layers in the neural network is smaller than the capacity of the first storage room, storing all the data involved during training for the neural network into the first storage room; and where the total data amount involved in the computation at all the layers in the neural network is greater than the capacity of the first storage room, offloading a part of the data involved in computation at all the layers in the neural network to the host storage room, wherein, whether it is necessary to load the data to the host storage room is determined using the data placement method as described in Embodiment 2.

Preferably, configuring the neural network for double buffering of data helps to minimize the communication overhead and accelerate training for the neural network. Where the storage room occupied by all the data required by one iteration of training for the neural network is greater than the memory of the GPU, during the forward-propagation process of the neural network, the data not required by computation at the present worked layer are offloaded to the host storage room. During the back-propagation process of the neural network, the data required by computation at the present worked layer are pre-stored into the memory of the GPU. The use of the computation overhead required by neural network training may hide the communication overhead caused by offloading and pre-storing the data.

S13: dispatching the computation resources of the CPU and the GPU according to the training operational sequence of the neural network so as to train the neural network.

Figure 5:
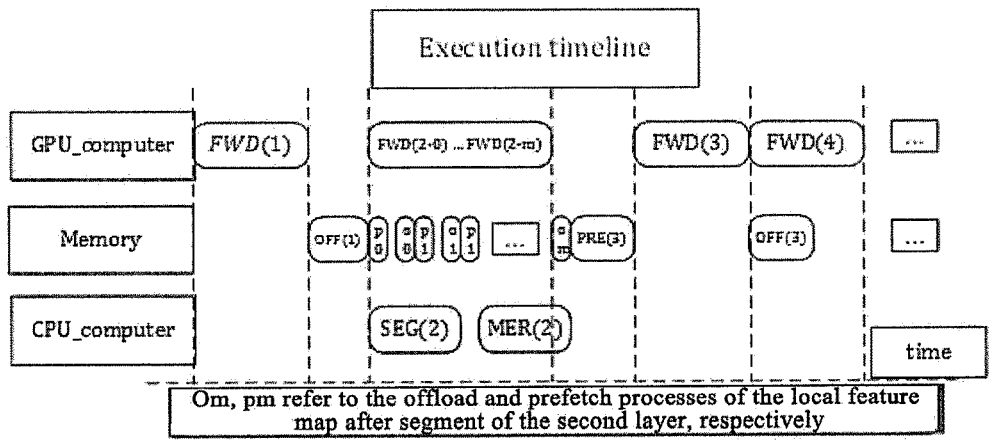
FIG. 5 is a flowchart of preferred task dispatch according to the present invention.

Preferably, FIG. 5 shows the flow of dispatching computation tasks. In FIG. 5, the abscissa indicates the time and the ordinate describes three execution streams. As can be seen clearly, the CPU end executes the computation tasks at the segment layer and the merge layer, and the CPU_computer execution stream executes SEG(2) so as to successively generate plural locally-input feature maps at the CPU end. Then the memory execution stream executes (P0, P1 . . . Pm) to transmit the plural locally-input feature maps to the memory of the GPU successively. Afterward, the GPU_computer execution stream performs convolution operation at the GPU end. The locally-input feature maps as the result of convolution are immediately offloaded by the memory execution stream to the host memory, and then used by the task MER(2) of the CPU_computer execution stream so as to generate a complete output feature map. The three execution streams are parallel to each other, so they are coincident along the timeline. Preferably, computation tasks at the segment layer and the merge layer are completed using the computation resources of the CPU. During the forward-propagation process, the CPU continuously generates locally-input feature maps when executing the computation tasks at the segment layer, and prefetches these locally-input feature maps to the memory of the GPU. Subsequently, the computation resources of the GPU are used to obtain the locally-output feature maps. The GPU when performing computation on the present local feature map offloads the previous locally-output feature map to the memory of the CPU. When the GPU executes the computation tasks, the CPU merges the continuously generated locally-output feature maps into a complete output feature map, thereby making the computation overhead of the GPU hide the most communication overhead and the computation overhead of the CPU, thereby reducing the effects of segmenting and merging on the speed of the while training. For minimizing the total data amount to be offloaded and prefetched during training, the data required by the segment layer and the merge layer are placed into the memory of the CPU. On the prerequisite that the memory room required by the largest layer to perform operation under the double-buffer configuration is reserved, the remaining data are placed into the memory of the GPU as many as possible, thereby reducing the communication overhead. Since training at the segment layer and the merge layer still needs a relatively large memory room, its computation is moved to the CPU.

Embodiment 4

This embodiment is a further improvement on previous embodiments, and the repeated content is omitted.

The present invention further provides a deep learning heterogeneous computing system based on layer-wide memory allocation, which at least comprises a neural network adjustment module, a data placement module, a scheduling module, an execution engine, a CPU, a GPU and a host memory. Therein, the neural network adjustment module serves to adjust the network structure, so as to the neural network can use the layer-wide memory allocation method to perform training in the limited memory of the GPU while ensuring correct training. The data placement strategy is to take the memory of the GPU as a cache of the host memory, and to place as many data as possible in the memory of the GPU, thereby reducing communication overhead. The scheduling module overall plans the computation resources across the CPU and the GPU, and assigns computation tasks at the segment layer and the merge layer to the CPU, in order to leverage the available computation resources and mitigate the effects of the adjustment of the neural network on the resulting performance. The execution engine controls the execution sequence of the layers during the neural network training, on the basis of the training operational sequence generated during the virtual iteration.

Preferably, where there is a layer in the neural network whose training requires a memory room greater than the memory capacity of the GPU, the neural network adjustment module is active. The neural network adjustment module converts the calculation of a certain layer into calculation of plural small layers, so as to break the limitation of the memory of the GPU. The data placement strategy has influence on the communication overhead during the training. In order to reduce the total amount of data needed to be unloaded and prefetched during the training, the data required by the segment layer and the merge layer are placed in the host memory. On the prerequisite that the memory room required by the largest layer to perform operation under the double-buffer configuration is reserved, the remaining data are placed into the memory of the GPU as many as possible, thereby reducing the communication overhead. On the other hand, the computation operation for the training at the segment layer and the merge layer is moved to the CPU so as to satisfy its relatively large memory requirements. The scheduling module overall plans the computation resources of the CPU and the GPU to match their computation works and accelerate the training. The execution engine works on the actual training, and control the training process according to the training operational sequence obtained through the virtual iteration. Training of a neural network requires iterations, and the operation sequence of every iteration is identical, thereby resulting in a training network model for prediction.

Preferably, the neural network adjustment module is such configured that when the memory room $R_1$ required by the operation at the $i^{th}$ layer is greater than the memory of the GPU, it enters a working mode where it dynamically adjusts the layer structure of the neural network model based on the manner the layer structure of the $i^{th}$ layer is changed. The data placement module is such configured that when the memory room $R_2$ required by all the data involved in the neural network model is greater than the memory of the GPU, it enters the working mode where it dynamically adjusts the data required by the training of the neural network model based on the data placement method. The scheduling module is such configured that it assigns computation tasks at the segment layer and the merge layer to the CPU. The execution engine is such configured that it controls computation at every layer to be performed according to the training operational sequence during the training of the neural network.

Preferably, the deep heterogeneous computing system further comprises a host memory. The CPU is such configured that when performing computation tasks at the segment layer or the merge layer, it pre-stores the locally-input feature maps obtained through computing to the memory of the GPU. The GPU is such configured that when working on the present locally-input feature map, it pre-stores the previous locally-input feature map to the host memory. Therein, when the GPU continuously performs computation based on the locally-input feature maps so as to obtain the locally-output feature maps, the CPU merges the locally-output feature maps so as to obtain the complete output feature map.

For clear explanation, the modular connection relation of the disclosed deep learning heterogeneous computing system is described below with reference to FIG. 6.

Figure 6:
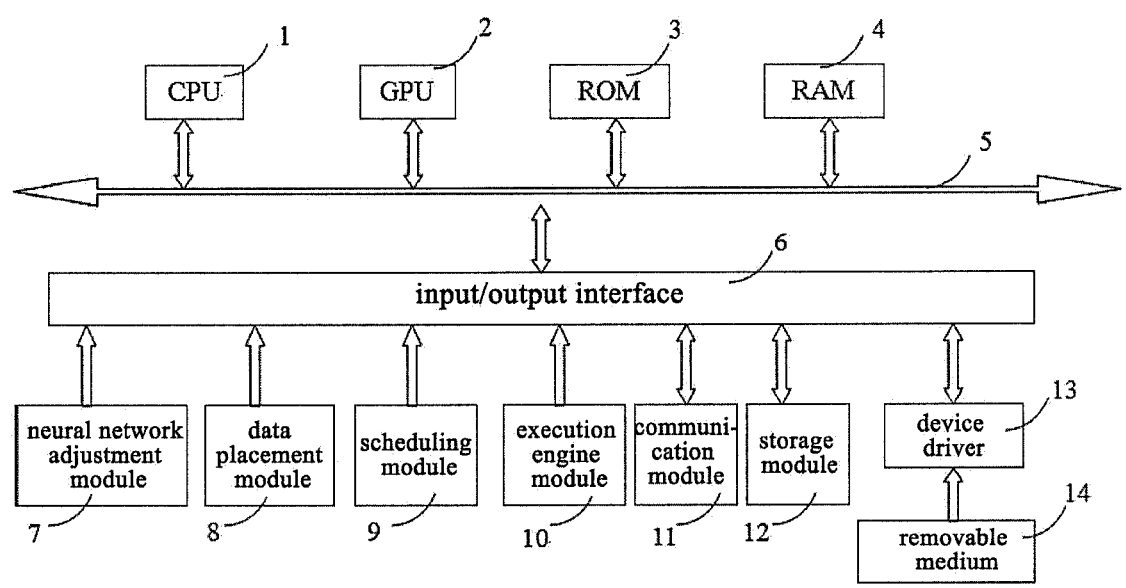
FIG. 6 is a modular diagram of a preferred deep learning heterogeneous computing system according to the present invention.

As shown in FIG. 6, the central processing unit (CPU 1) and the graphics processing unit (GPU 2) jointly perform various data processing according to the program stored in the read-only memory (ROM 3) or the program loaded from the storage module 12 to the random access memory (RAM 4). The CPU 1, the GPU 2, the ROM 3, the RAM 4 and the I/O port 6 are interconnected through the PCI Express 5. The neural network adjustment module 7, the data placement module 8, the scheduling module 9, the execution engine module 10, the communication module 11, the storage module 12 and the device driver 13 are all connected to the I/O port 6. Therein, the communication module 11 includes, for example, a LAN card and the network adapter of the modem. The communication module 11 may transmit data through the Internet. The storage module 12 may be a hard disk drive, a memory card, or a cache. A computer program stored in the removable medium 14 such as a hard disk drive or a USB flash drive may be installed into the storage module 12 through the device driver 13. Preferably, the disclosed heterogeneous computing method may be embedded into the storage module 12 in a way by which a computer program is programmed for the RAM 4 to use, so as to enable the CPU 1 and the GPU 2 to perform data processing in accordance with the embedded computer program.

Embodiment 5

Preferably, in an experiment, the disclosed system was equipped with: ubuntu16.04, Intel® Xeon® CPU E5-2680, nvidia K80 GPU, while the network models were made of ZFnet, VGG, siftflow-fcn32, and WRN-37-4. The data collected in the experiment are shown in the table below. The numbers following the network models represent the batch sizes. For instance, vgg(32) indicates that vggnetwork has a batch_size=32. Caffe is taken as the control and my_system denotes the system of the present invention. The data shown in the table are results of 10 iterations and the time consumed by training is expressed in second. The blank fields indicate that the caffe system was unable to train the relevant model. As proven by the experimental data, the system of the present invention can break layer-wide limitations to provide better model scalability and is capable of training larger and boarder network models.

| | 4G GPU memory/10 iteration's time | | | | | | | |
|---|---|---|---|---|---|---|---|---|
| Model/system | ZFnet (128) | ZFnet (256) | ZFnet (384) | vgg (16) | vgg (32) | vgg (64) | vgg (128) | siftflow- fcn32 | WRN- 37-4 |
| caffe | 13.0575 | | | 15.1558 | | | | | |
| my system | 10.0947 | 25.6147 | 40.6689 | 23.5791 | 35.3117 | 57.719 | 98.07 | 90.1215 | 542.368 |

While the above description has illustrated the present invention in detail, it is obvious to those skilled in the art that many modifications may be made without departing from the scope of the present invention and all such modifications are considered a part of the present disclosure. In view of the aforementioned discussion, relevant knowledge in the art and references or information that is referred to in conjunction with the prior art (all incorporated herein by reference), further description is deemed necessary. In addition, it is to be noted that every aspect and every part of any embodiment of the present invention may be combined or interchanged in a whole or partially. Also, people of ordinary skill in the art shall appreciate that the above description is only exemplificative, and is not intended to limit the present invention.

The above discussion has been provided for the purposes of exemplification and description of the present disclosure. This does not mean the present disclosure is limited to the forms disclosed in this specification. In the foregoing embodiments, for example, in order to simplify the objectives of the present disclosure, various features of the present disclosure are combined in one or more embodiments, configurations or aspects. The features in these embodiments, configurations or aspects may be combined with alternative embodiments, configurations or aspects other than those described previously. The disclosed method shall not be interpreted as reflecting the intention that the present disclosure requires more features than those expressively recited in each claim. Rather, as the following claims reflect, inventive aspects lie in less than all features of a single foregoing disclosed embodiment. Therefore, the following claims are herein incorporated into the embodiments, wherein each claim itself acts as a separate embodiment of the present disclosure.

Furthermore, while the description of the present disclosure comprises description to one or more embodiments, configurations or aspects and some variations and modifications, other variations, combinations and modifications are also within the scope of the present disclosure, for example within the scope of skills and knowledge of people in the relevant field, after understanding of the present disclosure. This application is intended to, to the extent where it is allowed, comprise rights to alternative embodiments, configurations or aspects, and rights to alternative, interchangeable and/or equivalent structures, functions, scopes or steps for the rights claimed, no matter whether such alternative, interchangeable and/or equivalent structures, functions, scopes or steps are disclosed herein, and is not intended to surrender any of the patentable subject matters to the public

What is claimed is:

1. A deep learning heterogeneous computing method based on layer-wide memory allocation to be executed by a CPU and a GPU jointly, the deep learning heterogeneous computing method comprising the steps of:

traversing a neural network model so as to acquire a training operational sequence and a number of layers L thereof;

calculating a memory room $R_1$ required by data involved in operation at an $i^{th}$ layer of the neural network model under a double-buffer configuration, where $1 \leq i \leq L$;

altering a layer structure of the $i^{th}$ layer and updating the training operational sequence when the memory room $R_1$ required by the operation at the $i^{th}$ layer is greater than a memory room of the GPU, the step of altering further comprising:

acquiring an operational type corresponding to each said layer of the neural network model based on the training operational sequence;

when the $i^{th}$ layer is a convolution layer and convolution operation is to be performed, segmenting an input feature map required by it to perform the convolution operation according to a height or width dimension before the convolution layer by inserting a segment layer so as to obtain a plurality of locally-input feature maps;

performing the convolution operation based on the locally-input feature maps, respectively, so as to acquire a plurality of corresponding locally-output feature maps;

merging the plural locally-output feature maps by inserting a merge layer after the convolution layer, so as to form a complete output feature map corresponding to the convolution layer; and updating the training operational sequence distributing all the data across a memory room of the CPU and the memory room of the GPU according to a data placement method when a memory room $R_2$ required by all data involved in all the layers of the neural network model is greater than the memory room of the GPU, wherein the data placement further comprises:

traversing the training operational sequence;

making data involved in the segment layer and the merge layer as first data;

marking data involved in the other layers as second data; and initializing an available memory room $M_1$ of the GPU that is equal to a total capacity of the GPU;

traversing the second data so as to identify a layer $L_1$ that requires the largest memory room and a layer $L_2$ that requires the second largest memory room, a memory room $R_{L1}$ required by all data involved during identification of the layer $L_1$, a memory room $R_{L2}$ required by all data involved during identification of the layer $L_2$, and a memory room $R_3$ required by the largest data block involved during identification of the layer $L_1$; and updating a marking of the largest data block to third data when both relations of $(R_{L1}-R_3)*2+R_3<M_1$ and $R_{L2}*2+R_3<M_1$ are satisfied; and updating a capacity of the available memory room $M_1$ to $M_1-R_3$; and performing iterative computation at each said layer successively based on the training operational sequence so as to complete neural network training.

2. The deep learning heterogeneous computing method of claim 1, wherein the step of altering the layer structure of the $i^{th}$ layer further comprises the steps of:

when the $i^{th}$ layer is a pooling layer, an activation layer or a batchnorm layer, segmenting the input feature map required by it to perform the operation according to a channel dimension by inserting the segment layer before the $i^{th}$ layer, so as to obtain the plurality of locally-input feature maps;

performing the corresponding operation based on the locally-input feature maps, respectively, so as to acquire the plurality of corresponding locally-output feature maps;

merging the plural locally-output feature map by inserting the merge layer after the $i^{th}$ layer, so as to form the complete output feature map corresponding to the layer; and updating the training operational sequence.

3. The deep learning heterogeneous computing method of claim 2, wherein the data placement method further comprises the steps of:

where either a relation of $(R_{L1}-R_3)*2+R_3 \geq M_1$ or a relation of $R_{L2}*2+R_3 \geq M_1$ is satisfied, updating the capacity of the available room $M_1$ to $M_1-R_{L1}*2$, and traversing all the second data and calculating a memory room $R_4$ it requires, in which:

where a relation of $R_4<M_1$ is satisfied, updating a marking of the second data to the third data; and updating the capacity of the available room $M_1$ to $M_1-R_4$.

4. The deep learning heterogeneous computing method of claim 3, wherein the data placement method further comprises the steps of:

traversing the second data so as to identify the layer $L_1$ that requires the largest memory room and the layer $L_2$ that requires the second largest memory room, a memory room $R_{L1}$ required by all data involved during identification of the layer $L_1$, the memory room $R_{L2}$ required by all data involved during identification of the layer $L_2$, and the memory room $R_3$ required by the largest data block involved during identification of the layer $L_1$;

where both the relations of $(R_{L1}-R_3)*2+R_3<M_1$ and $R_{L2}*2+R_3<M_1$ are satisfied, updating the marking of the largest data block to the third data;

updating the capacity of the available memory room $M_1$ to $M_1-R_3$;

repeating the preceding steps until either the relation of $(R_{L1}-R_3)*2+R_3 \geq M_1$ or the relation of $R_{L2}*2+R_3 \geq M_1$ is satisfied;

where either the relation of $(R_{L1}-R_3)*2+R_3 \geq M_1$ or the relation of $R_{L2}*2+R_3 \geq M_1$ is satisfied, traversing all the second data and calculating the memory room $R_4$ it requires, in which, where the relation of $R_4<M_1$ is satisfied, updating the marking of the second data to the third data; and updating the capacity of the available room $M_1$ to $M_1-R_4$.

5. The deep learning heterogeneous computing method of claim 4, wherein the data placement method further comprises a step of:

storing the first data into the memory room of the CPU, storing the remaining second data into the memory room of the CPU, and storing the third data into the memory room of the GPU.

6. The deep learning heterogeneous computing method of claim 5, wherein the step of calculating the memory room $R_1$ further comprises a step of:

counting tensor shapes of input data and output data required by operation at every layer in the neural network model so as to verify the memory room $R_1$.

* * * * *